(12) United States Patent
Isenschmid et al.

(10) Patent No.: US 11,254,386 B2
(45) Date of Patent: Feb. 22, 2022

(54) ELECTRIC BICYCLE HAVING A COMMUNICATION SYSTEM

(71) Applicant: MYSTROMER AG, Oberwangen b. Bern (CH)

(72) Inventors: Dominic Isenschmid, Niederscherli (CH); Christophe Wiedmer, Hindelbank (CH); Peter Egli, Münchenbuchsee (CH)

(73) Assignee: MYSTROMER AG

( * ) Notice: Subject to any disclaimer, the term of this patent is extended or adjusted under 35 U.S.C. 154(b) by 0 days.

(21) Appl. No.: 16/642,923

(22) PCT Filed: Aug. 28, 2018

(86) PCT No.: PCT/IB2018/056555
§ 371 (c)(1),
(2) Date: Feb. 28, 2020

(87) PCT Pub. No.: WO2019/043576
PCT Pub. Date: Mar. 7, 2019

(65) Prior Publication Data
US 2020/0346706 A1    Nov. 5, 2020

(30) Foreign Application Priority Data
Aug. 29, 2017 (CH) .................................... 01069/17

(51) Int. Cl.
*B62J 45/20* (2020.01)
*B62J 45/41* (2020.01)
(Continued)

(52) U.S. Cl.
CPC ................. *B62J 45/20* (2020.02); *B62J 3/10* (2020.02); *B62J 6/24* (2020.02); *B62J 43/30* (2020.02);
(Continued)

(58) Field of Classification Search
CPC ..... B62J 45/20; B62J 50/22; B62J 6/24; B62J 3/10; B62J 45/41; B62J 43/30; G08G 1/166; B62K 21/26; G08B 7/06; B62M 6/45
(Continued)

(56) References Cited

U.S. PATENT DOCUMENTS

| 2005/0035856 A1* | 2/2005 | McMahon | B62K 11/14 340/539.11 |
| 2009/0073112 A1* | 3/2009 | Basson | G06F 3/016 345/156 |

(Continued)

FOREIGN PATENT DOCUMENTS

| DE | 102013216931 A1 * | 2/2015 | ......... B60W 50/085 |
| DE | 10 2015 111 980 A1 | 2/2016 | |
| EP | 2 829 464 A1 | 5/2014 | |

OTHER PUBLICATIONS

English translation of the International Preliminary Report on Patentability issued in counterpart PCT application No. PCT/IB2018/056555 dated Mar. 3, 2020.
(Continued)

*Primary Examiner* — Daryl C Pope
(74) *Attorney, Agent, or Firm* — Ostrolenk Faber LLP

(57) ABSTRACT

An electric bicycle that has a communication system, including at least one electronic processing module for processing information for the rider of the electric bicycle, and at least one signal device for providing the processed information to the rider. To reduce safety risks due to the rider being distracted by his/her surroundings while riding the electric bicycle and to increase riding comfort, the at least one signal device is designed to output the information as a tactile, optical, and/or acoustic signal emitted by the electric bicycle in order to spontaneously influence the rider.

16 Claims, 7 Drawing Sheets

(51) Int. Cl.
*B62J 50/22* (2020.01)
*B62J 3/10* (2020.01)
*B62J 6/24* (2020.01)
*B62J 43/30* (2020.01)
*B62K 21/26* (2006.01)
*G08B 7/06* (2006.01)
*G08G 1/16* (2006.01)
*B62M 6/45* (2010.01)

(52) U.S. Cl.
CPC ............... *B62J 45/41* (2020.02); *B62J 50/22* (2020.02); *B62K 21/26* (2013.01); *G08B 7/06* (2013.01); *G08G 1/166* (2013.01); *B62M 6/45* (2013.01)

(58) Field of Classification Search
USPC .......................................................... 340/904
See application file for complete search history.

(56) References Cited

U.S. PATENT DOCUMENTS

| | | | | |
|---|---|---|---|---|
| 2009/0201127 A1* | 8/2009 | Stobbe | ................... | G07F 17/10 340/5.6 |
| 2015/0295993 A1* | 10/2015 | Hanuschak | ......... | H04M 1/6091 715/740 |
| 2016/0031525 A1* | 2/2016 | Craven | ................... | B60L 53/68 180/206.2 |
| 2016/0086489 A1* | 3/2016 | Aich | ...................... | G08G 1/163 340/903 |
| 2016/0221627 A1* | 8/2016 | Hines | ......................... | B62J 6/00 |

OTHER PUBLICATIONS

International Search Report dated Dec. 14, 2018 in corresponding PCT International Application No. PCT/IB2018/056555.
Written Opinion dated Dec. 14, 2018 in corresponding PCT International Application No. PCT/IB2018/056555.
A.L. Schwab et al., "Dynamics and Control of a Steer-by-Wire Bicycle," Proceedings, Bicycle and Motorcycle Dynamics 2013 Symposium on the Dynamics and Control of Single Track Vehicles, Nov. 11-13, 2015, 7 pages, Narashino, Japan; Retrieved from the Internet: URL:http://bicycle.tudelft.nl/schwab/Publications/schwab2013dynamics.pdf XP055527506 [retrieved on Nov. 27, 2018].
Examination Report dated Jan. 29, 2021 issued in corresponding European Patent Application No. 18788885.4 (without English Translation).

* cited by examiner

ELECTRIC BICYCLE HAVING A COMMUNICATION SYSTEM

CROSS-REFERENCE TO RELATED APPLICATIONS

The present application is a 35 U.S.C. §§ 371 national phase conversion of PCT/IB2018/056555, filed Aug. 28, 2018, which claims priority to Swiss Patent Application No. 01069/17, filed Aug. 29, 2017, the contents of which are incorporated herein by reference. The PCT International Application was published in the German language.

The present invention relates to an electric bicycle having a communication system.

TECHNICAL BACKGROUND

Electric bicycles, also referred to as pedelecs or light electric vehicles, are known from the prior art. They obtain their drive energy as well as energy for auxiliary units from energy storage devices such as rechargeable batteries or accumulators. In particular when the vehicles are designed as electric bicycles or electric motorcycles, additional drive energy may be generated with the aid of a pedal drive that is actuated by the rider. The rechargeable batteries are often mounted in an exchangeable or at least removable manner on or in the vehicle so that they may be electrically charged separately from the vehicle, exchanged for maintenance reasons, or replaced by a charged rechargeable battery as easily as possible.

Electric bicycles known from the prior art may have electronic control units that can be used by the rider for operating the electric bicycle and assisting with additional communication functions, such as identifying a location of the electric bicycle. For operation, the rider is provided with control elements that are, for example, mounted on the control unit itself or linked to the control unit by signal transmission, and in the form of buttons, for example, are situated on the handlebar of the electric bicycle.

The control units may have visual displays for visually depicting operating parameters and settings of the electric bicycle. In order to track his/her actions regarding the operating parameters and settings on the visual display, the rider must look at the display, thereby limiting awareness of his/her surroundings, which entails safety risks in particular while riding the electric bicycle.

SUMMARY OF THE INVENTION

It is an object of the invention to avoid at least some of the disadvantages of the prior art. In particular, it is an object of the invention to reduce safety risks due to the rider being distracted by his/her surroundings while riding an electric bicycle, and to increase riding comfort.

This object is achieved by the features of the invention.

In particular, the object underlying the invention is achieved by an electric bicycle having a communication system, comprising at least one electronic processing module for processing information for the rider of the electric bicycle, and at least one signal device for providing the processed information to the rider, wherein the at least one signal device is designed to output the information as a tactile, optical, and/or acoustic signal emitted by the electric bicycle in order to spontaneously influence the rider.

The approach according to the invention has the advantage that the rider can immediately perceive the tactile, optical, and/or acoustic signal without diverting his/her attention from the surroundings. By means of the signal, the rider may receive feedback from the electric bicycle concerning operation of the electric bicycle and/or other information that may be of interest, or even essential, in operating and riding the electric bicycle. Thus, the approach according to the invention assists with increasing the safety of the rider him/herself as well as safety in general while riding the electric bicycle.

The solution according to the invention may be supplemented and further enhanced by the following further embodiments, which in each case are in themselves advantageous:

According to one embodiment, it is provided that the processing module is part of a central electronic control unit of the electric bicycle and/or is in information-transmitting connection with the control unit. The processing module is thus integrated into the control unit or at least closely associated with the control unit, which assists the communication system with centrally managing relevant data with the aid of the processing module and allows signal emission by the signal device, not only for control data for the electric bicycle itself, but also additional data concerning supplementary information, which are not directly related to control data of bicycle, for example a selected drive or power assistance stage or recuperation stage of the electric drive, or a state of charge of the energy storage device.

According to one embodiment, it is provided that the electric bicycle may be equipped with an energy storage device that provides drive energy, wherein the communication system is connected to the energy storage device to receive operating power. The energy storage device may contain a drive battery and a backup battery. For example, essentially all of the electrical or electronic components of the electric bicycle may be supplied with electrical energy from the drive battery. The backup battery may be used in particular to continue to supply the communication system with power when, for example, the drive battery is discharged or when the drive battery is disconnected from the electric bicycle for charging. Due to the connection of the communication system to the energy storage device, the communication system may be reliably and generally continuously supplied with sufficient electrical energy. In addition, the communication system may easily be provided with information concerning the status of the energy storage device.

According to one embodiment, it is provided that the communication system is at least partially integrated into the handlebar and/or the stem of the electric bicycle. The tactile, optical, and/or acoustic signals may thus be provided in the customary visual, tactile, and/or auditory range of the rider, resulting in preferably minimal distraction from his/her surroundings. In addition, an at least partial arrangement of the communication system in the area of the handlebar and/or the stem of the electric bicycle facilitates acoustic and/or tactile operation of the communication system by the rider.

According to one embodiment, it is provided that the communication system is at least partially integrated into a frame of the electric bicycle. For example, at least energy transmission lines and/or data transmission lines for the communication system may be accommodated in the frame. In addition, the control unit may be integrated into the frame. Integrating the lines and the control unit into the frame makes it easier to protect them from harmful environmental influences such as wetness, moisture, and mechanical effects, and also creates an attractive, esthetic appearance of the electric bicycle. Furthermore, the integration assists with reducing safety risks, since the lines and the control unit cannot, for example, become caught in objects along the travel route or strike against them while traveling. Not least of all, integration helps with making it more difficult to steal the integrated parts of the communication system and of the control unit.

According to one embodiment, it is provided that the at least one signal device is designed to output a signal when the information represents a hazardous situation. The processing module of the communication system may thus be designed to recognize hazardous situations and/or data containing information about a hazardous situation, and to subsequently prompt the signal device to emit a certain signal, for example a warning signal, that represents a hazardous situation. The rider may thus be warned of hazardous situations, which helps to further reduce safety risks while riding an electric bicycle according to the invention.

According to one embodiment, it is provided that the communication system has at least one proximity sensor for detecting an approaching object, the proximity sensor being in signal-transmitting connection with the processing module. For example, a proximity sensor may be situated in the area of the handlebar, pointing in the travel direction, and/or in the rear area of the electric bicycle, for example in the area of a taillight of the electric bicycle. Thus, with the aid of the proximity sensors, proximity information from the front or the rear concerning certain objects may be detected and relayed to the communication system. In addition, information from the side may be detected with proximity sensors which are appropriately laterally oriented, and which may be situated in the area of the handlebar as well as in the area of the rear portion of the electric bicycle.

According to one embodiment, it is provided that the processing module is designed for processing direction information and/or distance information. Direction information and/or distance information may be determined via the proximity sensors, for example. Alternatively or additionally, the direction information and/or distance information may be transmitted by external information sources to the processing module. With the aid of the direction information and/or distance information, appropriate direction signals or distance signals may be provided to the rider via the signal device; the direction signals or distance signals may also be warning signals.

For example, a distance signal may be emitted when this is prompted by distance information about an object in front of or behind the electric bicycle. This distance signal may be a signal that is used to make the rider aware that an object behind the rider, for example another rider or a member of a group of riders, is located at a certain distance from him/her. Such an emission of a distance signal is helpful in particular in preferably keeping two riders or groups of riders together, or preventing them from losing one another.

A distance signal in the form of a warning signal may indicate when an object, such as another electric bicycle or an automobile or truck, is approaching the electric bicycle in a dangerous manner. Such a warning signal may thus induce the rider to take an evasive action, for example if the warning signal indicates that an object is approaching from the rear, which is often the case when electric bicycles are traveling on roadways that are used by all road users, and road users traveling faster or with more powerful engines than the electric bicycle start a passing operation. Warning the rider prior to the passing operation may help avoid an overreaction by the rider, for example an excessively sharp steering action for making an evasive maneuver.

Another frequently observed situation in which such a warning signal may be helpful is when the rider is listening to music through headphones or earbuds from a portable electronic device such as a Walkman, MP3 player, tablet PC, or mobile telephone, or is using the mobile telephone. In this case, the rider's acoustic awareness of his/her surroundings is often greatly impaired, as the result of which the rider is not aware, or becomes aware only relatively late, of vehicles approaching in particular from the rear, for example when they are already alongside the rider. The rider may then have a tendency to be startled and thus make oversteering actions, which may compromise the riding stability or put the rider on a collision course with other objects.

In such situations it is also frequently observed that vehicles starting the passing operation will give acoustic warning signals, for example sounding their horn, to courteously inform the rider of the planned passing operation, or to rudely or even threateningly prompt the rider to make room, which involves a certain potential conflict between the rider and the other road user. Even if the rider in such situations is in the right concerning applicable traffic regulations, a timely warning with the aid of a communication system according to the invention may avoid such conflict situations from the outset, and thus reduce risks for the rider and the other road users.

According to one embodiment, it is provided that the processing module is designed for processing navigation information. The navigation information may thus be relayed to the signal device. The signal device may provide the navigation information to the rider. For example, the navigation information may be approach information, for example when the rider approaches a destination or interim destination, such as a turnoff. Navigation systems generally operate with acoustic and/or visual signals or map displays. Such signals may be problematic in particular when riding an electric bicycle, since they may demand the attention of the rider or distract the rider from his/her travel route and/or traffic situation. Therefore, in particular in the case of navigation information it is advantageous when the processing module converts the navigation information into signals that prompt the signal device to emit tactile signals to the rider. The rider can perceive the tactile signals without thus limiting visual and/or acoustic awareness of his/her surroundings, which helps to further minimize safety risks.

According to one embodiment, it is provided that the signal comprises a light signal, a vibration signal, a change in steering resistance, and/or a change in temperature. A light signal may be provided by one or more lighting elements. Various lighting elements may be used to emit a variety of light signals in each case. Thus, for example, a plurality of lighting elements may be mounted at various locations on the handlebar, such as on the left and right, in front of and behind a steering axis or a steerer tube of the bicycle, in order to appropriately point to the left or right or the front or rear in the travel direction. The same applies for vibration signals, which are generally produced as vibrations by appropriate vibration generators. Changes in steering resistance may be used to facilitate or hinder a steering operation to the left or right. Changes in temperature may likewise be used directionally or nondirectionally for the signaling.

According to one embodiment, it is provided that the signal device is designed to cooperate with vibration elements on the handlebar, in the pedals, and/or in the saddle of the electric bicycle. As mentioned above, in particular a plurality of vibration elements mounted on the handlebar may be used to generate vibration signals that directionally or nondirectionally transmit situation-dependent information to the rider. Different vibration patterns may be used for signaling different information, for example navigation instructions, to the rider.

The vibration signals may be generated in the form of vibrations of different interval lengths. For example, shortening of an interval may signal that a destination, an interim destination, or an object is being approached. The same applies for vibration signals generated at the saddle, wherein in particular vibration elements mounted on the saddle may directionally indicate a certain event. In turn, vibration signals generated at the pedals are suited in particular for directional information that is associated with the left or right pedal.

According to one embodiment, it is provided that the signal device is designed to cooperate with at least two vibration elements that are associated with the handlebar grips of the electric bicycle. The handlebar grips are generally gripped by the hands of the rider when the electric bicycle is traveling. The handlebar grips in particular are thus suited for providing vibration signals, in the form of vibrations, as tactile signals to the rider. For this purpose, the vibration elements may be integrated into the handlebar grips. The communication system is advantageously designed to control a total of at least two vibration elements, i.e., one vibration element that is associated with each of the handlebar grips, independently of one another.

According to one embodiment, it is provided that the signal device is designed to influence the steering resistance by means of a steering torque influencing element. The steering torque influencing element may be situated, for example, in the area of the steerer tube and used to increase or decrease the steering resistance. For example, it may be provided that the signal device is designed to increase the steering resistance only in the direction of the vehicle approaching from the rear, or in the direction of the estimated travel route of the vehicle approaching from the rear alongside the bicycle.

In addition, the steering resistance may be increased when the communication system detects that one or both of the rider's hands are not on the handlebar grips. The steering torque influencing element may thus assist with stabilizing the steering angle or may act as a type of steering damper, which may help prevent the handlebar from swinging up or going out of control in some other way.

The at least one signal device is designed, for example, to increase the steering resistance in a steering direction when the information represents a change of direction in the steering direction or the opposite steering direction. The communication system may also be designed to generate predetermined patterns of changes in the steering resistance over time in order to output information to the rider. In addition, the at least one signal device may be designed to increase the steering resistance in such a way that riding the bicycle is significantly hindered when the processing module signals unauthorized use of the bicycle. Thus, for example, in the event of signaling indicating theft or attempted theft, or the failure to unlock the electric bicycle when security keys and/or vehicle identifiers are not correctly matched, the handlebar may be completely locked in a manner that is known, for example, for steering wheel locks in automobiles.

According to one embodiment, it is provided that a communication module or an interface device or an adapter of the electric bicycle is provided for emitting and/or for receiving information to/from external devices in the form of mobile devices, data memories, and/or medical devices. For this purpose, data may be exchanged between the communication system and mobile devices, data memories, and/or medical devices via the communication module, interface device, and/or adapter in a wired or wireless manner. In the case of mobile devices, the communication system may thus interact with the mobile devices or application programs/applications, so-called apps, that are executed on the mobile devices, in that on the one hand the apps are controlled and supplied with information by the communication system, and/or on the other hand the communication system is controlled and supplied with information by the apps.

For example, navigation data may be transmitted from the mobile device or a data memory to the communication system, so that the communication system outputs appropriate navigation signals via the signal device. Conversely, the apps may be controlled by means of the communication system, in that the communication system provides options for operating the apps, such as sending actuating signals and/or confirmation signals to the apps in order to control certain functions of the apps and adjust parameters of the apps as well as the mobile device. Thus, the communication system may control the volume of an audio signal that is emitted to the rider via the mobile device, for example via headphones. The audio signal may be changed, for example damped or reduced, when one of the above-mentioned proximity sensors recognizes the approach of a vehicle or some other object, in order to direct the attention of the rider to his/her surroundings.

In addition, playback functions of audio files that are stored on the mobile device or the data memory may be controlled. For example, the communication system may be designed to halt, pause, or stop the playback or select another title in a play list. Similarly, communication operations carried out with the mobile device may be controlled by means of the communication system, in that the communication system on the one hand emits a signal to the rider when, for example, a call or a message is coming in. On the other hand, the communication system may allow a call or a message to be accepted, and when possible, to control the volume of the call or message and/or the microphone sensitivity during the call.

The same applies for medical devices, such as mobile medical devices for detecting and monitoring physiological parameters of the rider, for example portable EKG devices, insulin pumps, and the like, that are worn on the rider's body. The communication system may thus be designed to receive data and in particular notifications from these medical devices and send data to the medical devices, for example to transmit information or warning signals, emitted by the medical devices, to the rider with the aid of the communication system or to operate the medical devices.

According to one embodiment, it is provided that the communication system is connected to tactile sensor elements of the electric bicycle for controlling the communication system with receipt of information. By use of the tactile sensor elements, the above-mentioned operating functions may be carried out on the communication system itself or on mobile devices, data memories, and medical devices that are in data-transmitting connection with the communication system. The tactile sensor elements thus form control elements for the communication system and for the mobile devices, data memories, and/or medical devices that are thus in data-transmitting connection.

The control elements in the form of buttons, keys, switches, and sensor bars and/or sensor fields may be situated in or on the handlebar grips and/or in or on the saddle. For example, such a control element, in particular a sensor field, may be situated as a strip along and/or around the handlebar grip in order to record operating signals as pushing, pulling, and/or rotary movements carried out by the rider in the area of the handlebar grip, without the rider having to take his/her hands off the handlebar grip, which helps to further minimize safety risks when riding the electric bicycle.

In addition, such control elements may recognize whether the rider is gripping the handlebar grips, and is thus actuating control functions. For example, an electric drive power assist may be reduced by the electric drive of the electric bicycle when the communication system recognizes that at least one of the handlebar grips is not being properly gripped while riding. Alternatively or additionally, when the improper grip is recognized the steering resistance may be increased, as mentioned above.

As a further alternative or additional option, a temperature conditioning device for changing the temperature may be operated and controlled with the control elements. In the area of the handlebar grips, the functioning of the temperature conditioning device may be controlled on the basis of a proper grip, by preventing a temperature conditioning function of the temperature conditioning device when at least one of the handlebar grips is not gripped. In addition, the temperature conditioning device may be controlled or regulated by using temperature sensors that are connected to the communication system and situated in the handlebar grips and/or in the saddle, for example.

Moreover, the object underlying the invention is achieved by a temperature conditioning device for an electric bicycle having an electronic control unit, the temperature conditioning device being designed for signal-transmitting connection to the control unit.

An electric bicycle according to the invention has a control unit that is designed to interact with a temperature conditioning device according to the invention.

This approach according to the invention has the advantage that the temperature conditioning device and the electric bicycle, in mutual interaction with one another, allow control and regulation functions of the temperature conditioning device and of the electric bicycle. The control unit of the electric bicycle may be designed for controlling, regulating, and operating the temperature conditioning device. The temperature conditioning device is essentially captively joined to the electric bicycle and exactly matched thereto or integrated therein to the greatest extent possible.

The safety risks resulting from operation of the temperature conditioning device may thus be minimized and riding comfort may be increased. By use of the control unit, setting and parameterization may be automatically and/or manually carried out concerning the extent to which the temperature conditioning device is used for temperature control, and/or how and to what extent the temperature conditioning device is to obtain energy or is to be authorized to obtain energy, for example in that its prioritization is subordinate to an electric drive of the electric bicycle.

According to another embodiment, it is provided that the temperature conditioning device contains at least one latent heat storage element. A latent heat storage element may be used to absorb thermal energy during the charging operation of the energy storage device of the electric bicycle, when the electric bicycle and/or the energy storage device are/is connected to a power supply, for example a public power grid. In addition, the latent heat storage element may absorb heat when the electric bicycle is operated in a recuperation mode, when an electric drive of the electric bicycle is generating electrical power, for example due to the electric bicycle decelerating its traveling speed and/or traveling downhill.

The thermal energy absorbed by the latent heat storage element is stored in the latent heat storage element [in] a phase transition of a storage medium contained therein, for example as melting enthalpy. Due to initiation of a heat release process, for example a solidification process in the case of a storage medium that is molten in the heat-storing state, a quantity of heat corresponding to the melting enthalpy is released in the form of solidification enthalpy, without the need for an external feed or supply of energy, which is advantageous in particular for electric bicycles due to their energy storage device or rechargeable battery generally having a limited storage capacity which should not be unnecessarily burdened by temperature conditioning processes of the temperature conditioning device, since stored electrical energy should preferably be completely available for driving the electric bicycle.

According to another embodiment, it is provided that the temperature conditioning device includes at least one heating element and/or one cooling element for heating or cooling a handlebar grip and/or a saddle of the electric bicycle. In other words, the temperature conditioning device may contain both a heating device and a cooling device. For achieving a cooling effect, at least one Peltier element may be used, which is also usable for heating. Alternatively or additionally, a resistance heating element may be used for heating. The latent heat storage element, cooling element, and/or heating element may be combined into preferably compact units, which are specially designed, for example, for mounting on handlebar, in particular in the area of the handlebar grips or in the handlebar grips, and in the saddle. For operating the temperature conditioning device, power and/or signal supply lines may be laid to these units in a targeted manner, preferably inside the frame, the seat post, and/or the handlebar of the electric bicycle.

According to another embodiment, it is provided that the temperature conditioning device includes at least one heating element and/or at least one cooling element for heating or cooling a handlebar grip and/or a saddle of the electric bicycle. Heating in the area of the handlebar grip is advantageous, since at relatively low outside temperatures the hands and in particular the fingers of the rider are greatly chilled to a disproportionate extent due to the headwind. At least one heating element mounted in the handlebar grip helps to counteract this chilling. A heating element situated in the saddle may likewise assist in heating of the saddle that is pleasant for the rider, in particular when the saddle is very cold prior to starting to ride the electric bicycle and/or when very low outside temperatures prevail.

In addition, a cooling element on the handlebar grip and in particular in the saddle may provide a pleasant cooling effect for the rider when the outside temperature is relatively high and/or the rider is carrying out very strenuous activities and his/her body therefore has a tendency to overheat. To counteract overheating, the human body generally tends to perspire, which is even more pronounced under physical stress, for example when the electric bicycle is driven by muscle power. Perspiration may be perceived as unpleasant, especially when it saturates the rider's clothing and the rider has no opportunity to change clothes, which may be very objectionable to the rider when he/she has social contact immediately after riding the electric bicycle. The use of cooling elements may help to reduce perspiration and thus avoid saturation of the clothing.

According to another embodiment, it is provided that the temperature conditioning device includes at least one heating element for each of two handlebar grips on the handlebar of the electric bicycle, the at least two heating elements being designed to heat the handlebar grips independently of one another and/or differently from one another. In other words, the handlebar grips may be heated independently of one another. For example, to conserve heat energy, operation of the heating elements may be interrupted when the rider does not grip or touch the particular handlebar grip, or only weakly or partially grips or touches it. Similarly, cooling elements associated with the handlebar grips may also be operated independently of one another. It is likewise possible to operate temperature conditioning devices on the handlebar and the saddle independently.

According to another embodiment, it is provided that the temperature conditioning device is designed to control the temperature of the two handlebar grips differently, and thus communicate to the rider a planned change in direction. A planned change in direction may thus be communicated by the handlebar grip that points in the planned direction having a higher temperature than the other handlebar grip. Heating of the handlebar grips for signaling a change in direction may take place in particular in recuperation mode, for example when a braking operation takes place prior to a change in direction, when the energy for signaling the change in direction may be obtained.

This is advantageous in particular when not all of the energy that is obtained during the recuperation can be stored in the energy storage device, for example because its storage state is too high for storing additional electrical energy, and/or when an electric current obtained during the recuperation is greater than a maximum possible or allowable charging current for the energy storage device. Such energy storage operations in combination with signaling operations may be automatically regulated and controlled, or manually set or parameterized by the rider, by means of the control unit.

According to another embodiment, it is provided that the control unit includes a communication module for receiving navigation information. The navigation information may contain distance information and/or change in direction instructions. By use of the distance information, for example the distance of the electric bicycle and thus an expected travel time until reaching a planned destination or interim destination may be calculated. Based on this calculation, it may in turn be determined to what extent a filling level of the energy storage device is sufficient for reaching the destination or interim destination, or upon reaching the destination or interim destination, what travel conditions, or what level of energy consumption, or an energy surplus or an energy deficiency corresponding to the particular riding mode, would prevail.

By use of the calculated energy surplus and/or deficiency, the energy consumption or energy distribution to consumers within the electric bicycle, such as the electric drive and/or the temperature conditioning device, may be regulated by the control unit. When the control unit recognizes, for example, that under the prevailing energy consumption of the temperature conditioning device a quantity of energy remaining in the energy storage device is not sufficient to reach the destination or interim destination, the control unit may generate a corresponding warning signal for the rider and/or adjust or at least restrict the power supply to the temperature conditioning device.

In addition, by defining interim destinations, the rider may adapt the energy consumption to certain stages of his/her travel itinerary or planned route and their special features. Thus, for example, it is conceivable that the rider may have to cross over a mountain along his/her planned route, whereby initially a general ascent must be accomplished, and after reaching the maximum high point a general descent must be carried out. It is thus desirable for the rider to preferably have sufficient energy reserves in the energy storage device for a satisfactory electromotive drive of the electric bicycle until reaching the maximum high point. In contrast, during the descent the electric bicycle may be operated in recuperation mode, so that the energy obtained from the recuperation may be available to a sufficient degree for charging the energy storage device and/or for operating the temperature conditioning device.

Thus, in all embodiments according to the invention it is advantageous when the control unit is designed to process height profile information and use it for energy management. The height profile information may be provided to the control unit in particular as part of the navigation information. Based on the height profile information, the control unit may regulate the energy consumption of individual components of the electric bicycle, the drive, and/or the temperature conditioning device, or at least provide this information to the rider via appropriate signals and/or displays.

According to another embodiment, it is provided that the temperature conditioning device is designed to produce a temperature conditioning effect in the area of main blood vessels of a rider of the electric bicycle. Thus, for example, the arteria *radialis* and/or vena *radialis* in the area of the rider's hands, and the arteria *femoralis* and/or vena *femoralis* in the area of the rider's pelvis are available for producing a temperature conditioning effect, in particular in corresponding adjoining and/or surrounding skin regions of the rider. As the result of producing the temperature conditioning effect close to such main blood vessels, the temperature conditioning effect may have an impact in a preferably extensive area of the rider's body, which helps in particular to avoid general hypothermia or overheating of the rider. On the other hand, it is also possible, for example, to increase the temperature of at least one of the handlebar grips in such a way that riding on the electric bicycle is significantly hindered when the control unit generates and/or receives a signal that indicates unauthorized use of the electric bicycle.

According to another embodiment, it is provided that the temperature conditioning device includes at least one thermal sensor element or temperature sensor for measuring a temperature. The temperature to be measured may be, for example, an ambient temperature, a temperature of components of the electric bicycle, and/or a temperature of the rider. A temperature conditioning function of the temperature conditioning device may be regulated by the control unit, based on the particular measured temperature.

According to another embodiment, it is provided that an electric bicycle according to the invention may be equipped with an energy storage device that provides drive energy for the electric bicycle, the temperature conditioning device being connected to the energy storage device so as to receive operating energy. Such energy storage devices generally have a relatively large energy storage capacity. The intent is to be able to provide sufficient energy for operating the temperature conditioning device over a certain period of time in order to allow the rider the most comfortable riding experience possible.

According to another embodiment, it is provided that the electric bicycle is designed to supply the temperature conditioning device with electrical energy that is obtained in a recuperation mode of the electric bicycle. As mentioned above, it may be particularly advantageous during the recuperation mode to operate the temperature conditioning device and/or to supply it with energy in such a way that a storage effect is achieved in or with the temperature conditioning device. This storage effect may, for example, involve temperature-controlled components and elements of the electric bicycle being preheated and/or precooled, so to speak, by the temperature conditioning device so that a certain heating or cooling power is available that does not burden the energy storage device. On the one hand, for achieving the storage effect a temperature may be set that is at least temporarily above or below a desired temperature level. On the other hand, thermal energy may be stored in a latent heat store or withdrawn therefrom in order to achieve the storage effect.

According to another embodiment, it is provided that the control unit is designed to put the temperature conditioning device into operation or take it out of operation at a defined point in time. Defined points in time may be specified by the rider in order to operate the temperature conditioning device beginning at a certain point in time before the planned start of travel on the electric bicycle, or up to a planned point in time after traveling on the electric bicycle. Thus, for example, before the trip is started, the temperature conditioning device may be set to a desired temperature level by heating when the electric bicycle is parked, for example outside or in unheated spaces or surroundings with relatively low outside temperatures. The rider may then use an electric bicycle that is in a sense preheated. On the other hand, the electric bicycle may be precooled when it is parked at a relatively high ambient temperature and/or is exposed to solar radiation. Preheating and/or precooling may be advantageously carried out in particular when the electric bicycle is connected to a power supply grid and/or to an additional supply battery prior to traveling, for example to charge the energy storage device.

According to another embodiment, it is provided that the control unit is designed to receive an approach signal that represents the approach of the rider toward the electric bicycle, the control unit also being designed to put the temperature conditioning device into operation after receiving the approach signal. The approach signal may be triggered by using an electronic security key and/or an electronic vehicle identifier for the electric bicycle, or may contain same.

The electronic security key and/or the electronic vehicle identifier may be stored in an appropriate electronic access means, such as an electronic key, a badge, a memory card, or the like and/or managed and/or stored in a mobile device, for example a mobile telephone. The control unit may be designed to recognize an approach by the access means. Alternatively or additionally, an approach signal may be sent from the mobile device. As a further alternative or additional option, a tactile sensor may recognize an approach in the form of physical contact of the rider with the electric bicycle, for example when the rider grips the handlebar grips, sits on the saddle, and/or places his/her feet on the pedals or engages form-fit elements on his/her shoes with mating form-fit elements on the pedals.

According to another embodiment, it is provided that the control unit is designed to receive weather information for controlling the temperature conditioning device. By use of the weather information, the temperature conditioning device may be operated proactively and/or corresponding to the particular weather conditions. In addition, the weather information may be used to calculate an expected energy consumption.

According to another embodiment, it is provided that the control unit is designed to receive signals from an external device for controlling the temperature conditioning device. The control unit is provided with a communication module for wireless and/or wired receipt and/or transmission of signals. The external device may be, for example, a management device for managing the functions of the electric bicycle, for example a computer or the like. In addition, the external device may be designed as a mobile device, a data memory, and/or a medical device. The temperature conditioning device may thus be set, controlled, and/or parameterized corresponding to the particular requirements by use of the external device, which includes use of all signals, parameters, and physical variables described herein.

DESCRIPTION OF THE FIGURES

Exemplary embodiments of the invention are described with reference to the appended figures.

The figures show exemplary embodiments of the inventive subject matter strictly by way of example, wherein features as described above may be arbitrarily combined with one another or also omitted, depending on the particular requirements.

In the figures:

FIG. 1 shows a schematic side view of an electric bicycle according to the invention;

FIG. 2 shows a schematic perspective view of an electric bicycle according to the invention;

FIG. 3 shows a detail III from FIG. 2;

FIG. 4 shows a schematic cross-sectional view of the handlebar of an electric bicycle according to the invention;

FIG. 5 shows a detail V from FIG. 2;

FIG. 6 shows a schematic diagram of a communication system according to the invention for an electric bicycle; and FIG. 7 shows a schematic diagram of a communication system according to the invention together with an electric bicycle according to the invention.

CARRYING OUT THE INVENTION

Figure 1:
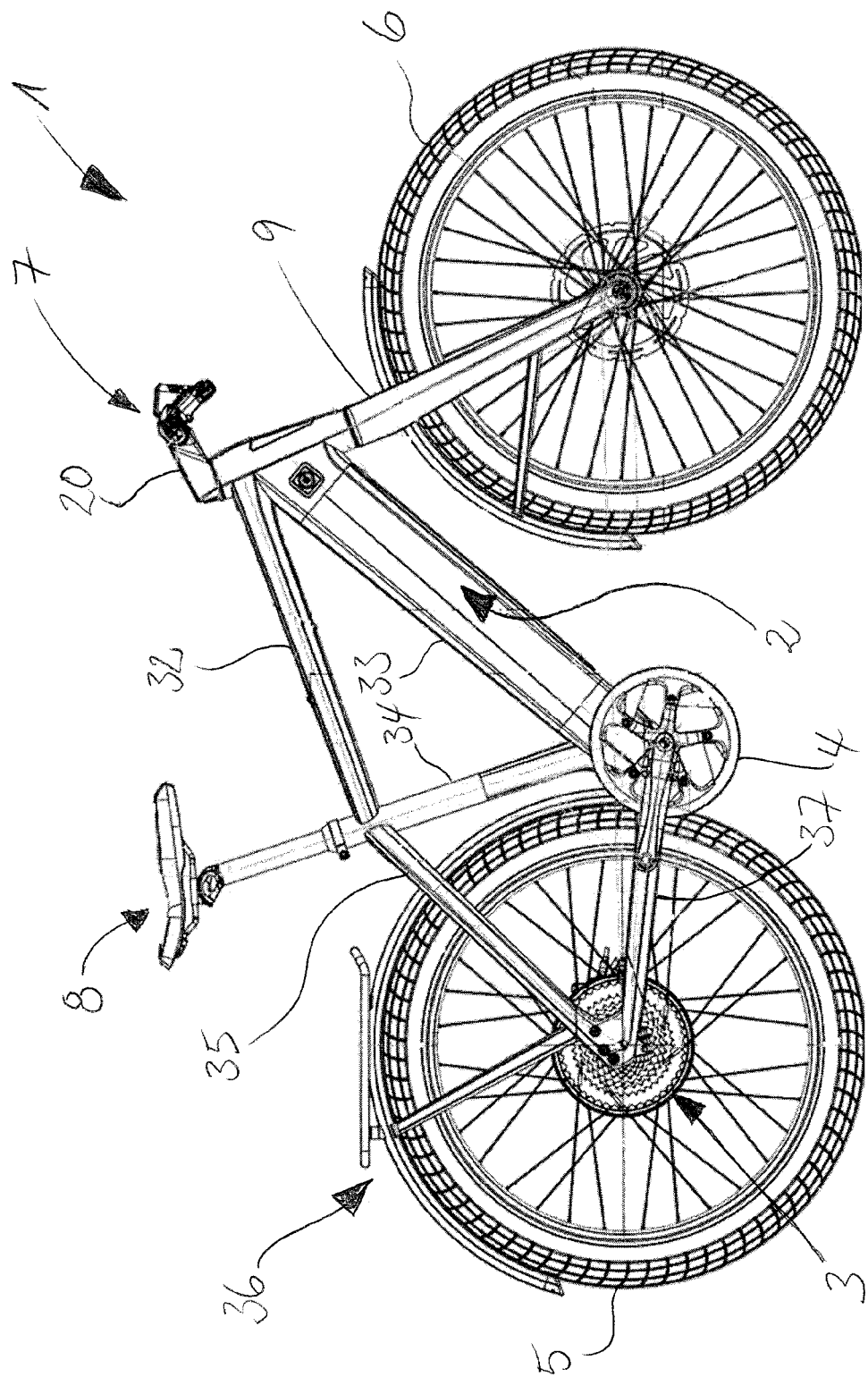

FIG. 1 shows a bicycle according to the invention in the form of an electric bicycle 1 having an energy storage device 2, in a schematic side view. In addition to an electric drive 3, the electric bicycle 1 has a pedal drive 4 for driving a rear wheel 5 that is used as a drive wheel. In addition, the electric bicycle 1 has a front wheel 6, handlebar 7, and a saddle 8 for a rider or user (not shown). The front wheel 6 is accommodated on a fork 9 of the electric bicycle 1.

Figure 4:
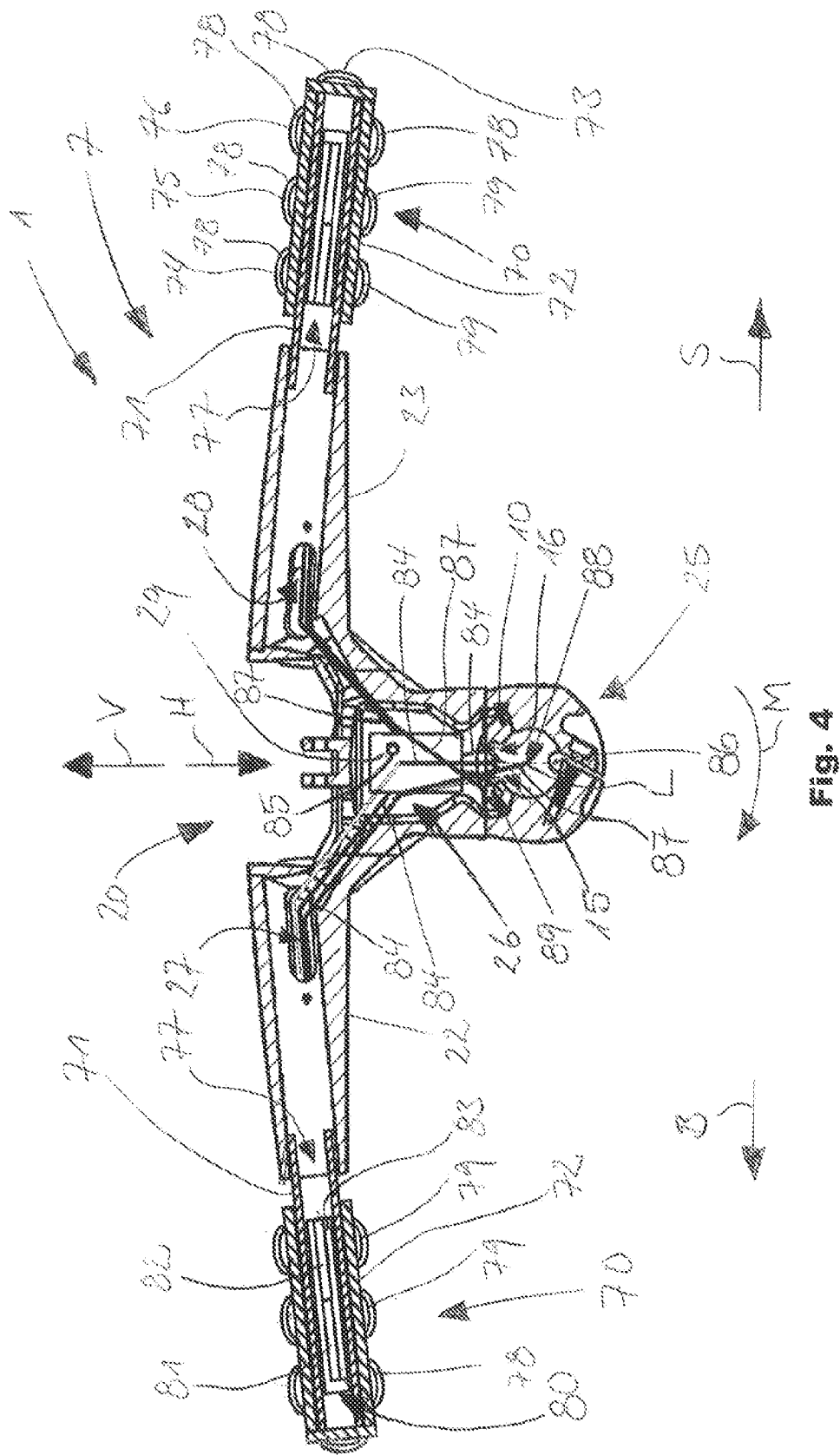

A hollow cylindrical component 10 in the form of a type of socket body provides an inner cavity 11 and line holders 15, 16 in a stem 20 of the electric bicycle 1, which is provided with handlebar connecting pieces 22, 23, a shaft receptacle 25, a cavity 26, line guides 27, 28, and an electronic component 29 (see FIG. 4). The stem 20 connects the handlebar 7 to a bicycle frame or frame 31 of the electric bicycle 1. The frame 31 supports the energy storage device 2, the electric drive 3, the pedal drive 4, the rear wheel 5, the handlebar 7, the saddle 8, and the fork 9, and includes a top tube 32, a down tube 33, a seat tube 34, and an upper tube 35 which together with a lower tube 37 forms a rear assembly 36.

Particularly advantageous embodiments of the hollow cylindrical component 10 and its interaction with the stem 20 and other elements and components of the electric bicycle 1 are disclosed in patent application Ser. No. 16/642,917 by the present applicant, with the title "HOLLOW CYLINDRICAL COMPONENT AND STEM FOR A BICYCLE, AND BICYCLE," for which application was filed on the same day as the present disclosure, and whose disclosed content is hereby incorporated by reference in its entirety into the present description.

Figure 2:
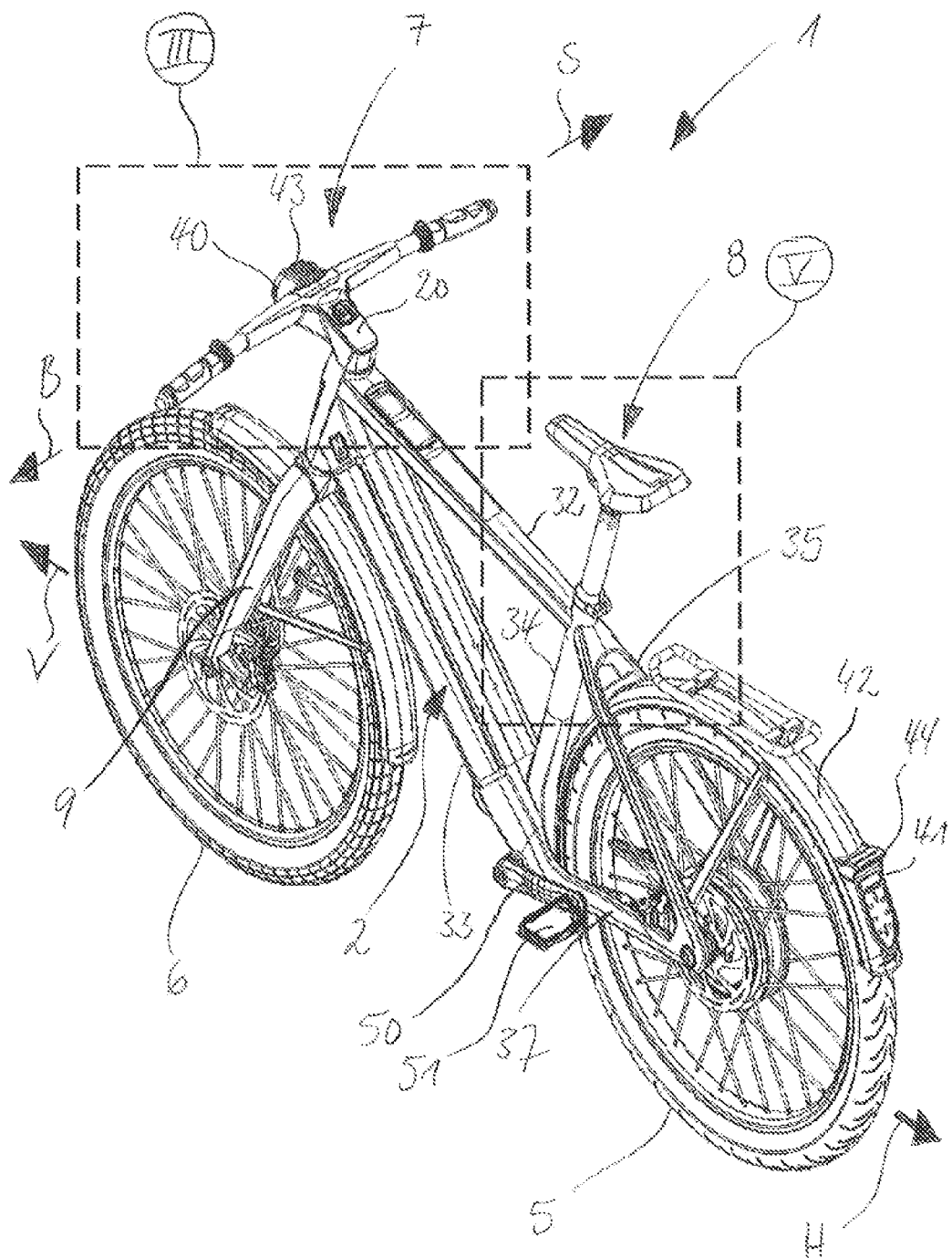

FIG. 2 shows a schematic perspective view of the electric bicycle 1. The electric bicycle 1 is generally driven in a travel direction V, i.e., forward, which is opposite a rear direction H, i.e., backwards. With the aid of the handlebar 7 and by shifting the weight of the rider, the electric bicycle 1 may be steered to the port side B, i.e., to the left viewed in the travel direction V, and to the starboard side S, i.e., to the right viewed in the travel direction V. A headlight 40 pointing in the travel direction V is mounted on the handlebar 7. A tail light 41 pointing in the rear direction H is mounted in the area of the rear assembly 36, in the present case, for example, on a fender 42 which at least partially encloses the rear wheel 5.

The electric bicycle 1 has a front proximity sensor 43 which is oriented in the travel direction V, and which may be situated on the headlight 40, for example. A rear proximity sensor 44 is oriented in the rear direction H, and may be mounted on the tail light 41, for example. The proximity sensors 43, 44 are designed to detect an approach of the electric bicycle 1 toward objects in the travel direction V or in the rear direction H. The proximity sensors 43, 44 can detect the distance between the electric bicycle 1 and the object, based on ultrasonic sensors and/or radar sensors, for example.

Also apparent in FIG. 2 is one of two crank arms 50 of the electric bicycle 1, which are used for driving the electric bicycle 1 by muscle power of the rider, and which have pedals 51 for this purpose. The pedals 51 may be designed according to the particular requirements, so that the rider either simply rests his/her feet, or shoes worn on the feet, on the pedals 51, or is connected to the pedals 51 by a form-fit closure created between the shoes and the pedals 51.

Figure 3:
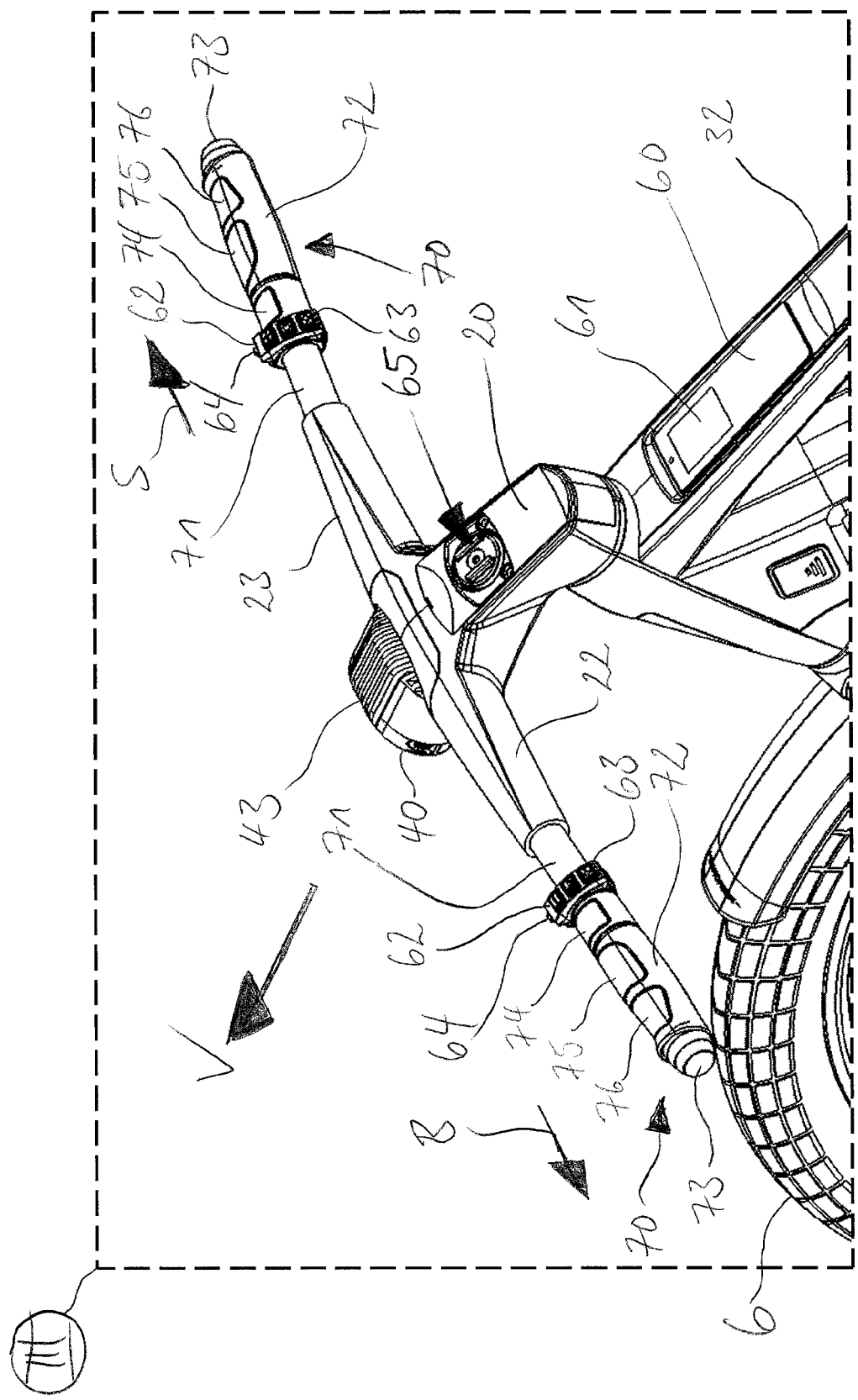

FIG. 3 shows a detail III from FIG. 2. The electric bicycle 1 is provided with an electronic control unit 60. In the present exemplary embodiment, the control unit 60 of the electric bicycle 1 is integrated into the top tube 32. An electronic display device 61 of the control unit 60, in the present case in the form of a display such as an LCD display, is integrated into a housing of the control unit 60, which is inserted into the top tube 32 in essentially flush alignment with a surface of the top tube 32. Operation of the control unit 60 is made possible via operating units 62, which for this purpose each have at least one, in the present case a plurality of, control buttons 63. Lighting elements 64 situated on the operating units 62 allow emission of light signals. An adapter 65 of the electric bicycle 1 is designed for fastening a device (see FIG. 7), such as a mobile telephone, a mobile medical device, a data memory, or the like, to the electric bicycle 1 and connecting the control unit 60 and/or the energy storage device 2 to the mobile device in a data- and/or energy-transmitting manner.

The operating units 62 are fastened to the handlebar 7 in such a way that the rider can operate the control buttons 63 with his/her thumbs when the rider's hands are gripping handlebar grips 70 of the electric bicycle 1 mounted on the handlebar 7. The handlebar grips 70 are in each case accommodated in a handlebar tube 71, which is mounted in the stem 20. The two handlebar tubes 71 are accommodated in one of the handlebar connecting pieces 22, 23, respectively, of the stem 20. Alternatively, a single continuous handlebar tube 71 may be used instead of the two handlebar tubes 71 in order to fasten the two handlebar grips 70 thereto. A support area 72, a grip end area 73, and finger areas 74, 75, 76 in the form of an inner finger area 74, a middle finger area 75, and an outer finger area 76 are formed on each of the handlebar grips 73.

The support area 72 is designed and arranged for supporting the hand, in particular the palm, of the rider. The grip end area 73 generally protrudes from the handlebar grips 70 in the port direction B and the starboard direction S in such a way that, when the handlebar grips 70 are gripped by the rider's hands, it extends in each case beyond the edge of the hand in the port direction B and the starboard direction S, and thus generally forms a lateral outer end of the electric bicycle 1 together with the rider. The finger areas 74, 75, 76 are designed for supporting the rider's fingers. Thus, the index finger is placed on the inner finger area 74, the middle and/or ring finger are/is placed on the middle finger area 75, and the ring finger and/or little finger are/is placed on the outer finger area 76.

FIG. 4 shows a schematic cross-sectional view of the handlebar 7 of the electric bicycle 1. A clearance space 77 is formed in the handlebar 7 inside the handlebar connecting pieces 22, 23, and continues up to the handlebar tubes 71. Distal end areas of the handlebar tubes 71 are tightly enclosed by the handlebar grips 71, whose grip end area 73 sealingly closes the clearance spaces 77. Situated in each case in the support area 72, grip end area 73, and finger areas 74, 75, 76 is at least one tactile sensor element 78 that is accommodated by an elastic layer, such as a skin-like layer of rubber and/or plastic, in the finger areas 74, 75, 76 which forms the handlebar grip 70, with a hermetic seal from the external surroundings of the electric bicycle 1. The tactile sensor element 78 includes at least one electrical or electronic component, such as a (piezo)resistive, inductive, capacitive, and/or optical structural or switching element, that is sensitive to distance, force, pressure, pulse, or direction.

The rider may initiate control signals via the sensor elements 78. In particular, the sensor elements 78 situated in the finger areas 74, 75, 76 may be actuated by the rider in a targeted manner with the index finger, middle finger, ring finger, and/or little finger in order to trigger corresponding control signals. Sensor elements 78 situated in the grip end area 73 may on the one hand be used for inputs by the rider. On the other hand, with the aid of these sensor elements 78 in the grip end areas 73 it may be recognized whether the grip end area 73 is in contact with another object. For example, if the electric bicycle 1 is stationary, i.e., is not moving, and the sensor element 78 detects contact of the grip end area 73 with an object, this may indicate that the electric bicycle 1 is leaning against an object and is parked, so to speak. With the aid of sensor elements 78 situated in the support area 72 and/or in the finger areas 74, 75, 76, it may also be recognized whether the handlebar grips 70 are being properly gripped by the rider.

The handlebar grips 70 each contain at least one vibration element 79. The vibration elements 79, similarly as for the sensor elements 78, are advantageously accommodated by an elastic layer, such as a skin-like layer of rubber and/or plastic, in the handlebar grips 70 that forms the handlebar grip 70, at least in sections, with a hermetic seal from the external surroundings of the electric bicycle 1. In the present exemplary embodiment, two vibration elements 79 are situated in each case [in] the support areas 72 of the handlebar grips 70. The vibration elements 79 include vibration generators which are designed for emitting vibrations, and which for this purpose contain electric motors with an imbalance and/or some other type of magnetic drives, such as voice coils and/or capacitive elements, that cooperate with membranes, for example, to emit electromagnetically generated vibrations. Arranging the vibration elements 79 in the support areas 72, where the palms of a rider gripping the handlebar grip 70 generally rest with at least partial support of the rider's body weight, has the advantage that vibrations may be very effectively transmitted to the rider due to the resulting close contact between the palms and the handlebar grip 70.

In addition, a temperature conditioning device 80 of the electric bicycle 1 is situated in each case in the clearance space 77 of the handlebar 7 in the area of the handlebar grips 70. The temperature conditioning devices 80 are protected from harmful environmental influences by accommodating the temperature conditioning device 80 in the clearance space 77 that is hermetically sealed by the handlebar grips 70. The temperature conditioning device 80 includes at least one cooling element 81, at least one heating element 82, and/or at least one latent heat storage element 83. By use of the cooling element 81, the handlebar grips 70 may be cooled, preferably in the support area 72, to ensure cooling of the rider, perceived as pleasant, when the rider is under relatively high physical stress and/or at relatively high outside temperatures. For example, the cooling element 81 may include a Peltier element. The heating element 81 may likewise include the Peltier element and/or electrical resistance heater.

An arrangement of the temperature conditioning device 80 in the area of the support areas 72 may in particular be designed in such a way that at least one cooling element 81 is situated as closely as possible to main blood vessels of the hand, for example the arteria *radialis* and/or vena *radialis*, to achieve a targeted cooling temperature conditioning effect that is noticeable and perceived as pleasant by the rider, and which may have an impact in the rider's entire body due to heat transfer to the main blood vessels. The same applies for the at least one heating element 82 in each of the handlebar grips 70; for the heating elements 82, it may also be particularly advantageous when they heat the handlebar grips 70 in the finger areas 74, 75, 76. At relatively low outside temperatures, it is known from experience that in particular the rider's fingers become uncomfortably chilled due to the headwind, against the travel direction V, that meets the fingers. Thus, when the outside temperature is relatively cold, heating the finger areas 74, 75, 76 may contribute to temperature control of the handlebar grips 70 that is very comfortable for the rider.

The at least one latent heat storage element 83 of the temperature conditioning device 80 is designed to store thermal energy, with as little loss as possible, for a preferably large number of repeat cycles and a preferably long period of time. For this purpose, the latent heat storage element 83 preferably contains a phase change material for radiating and absorbing heat of fusion, heat of solution, and/or heat of absorption, such as paraffin-containing substances and/or salts as the storage medium. The storage medium is generally melted at its particular melting temperature, for example with the aid of the heating element 82. Discharge of the latent heat storage element 83 for emitting thermal energy for heating the handlebar grip 70 takes place by solidification of the storage medium via its release of heat of solidification. The solidification may occur by crystallization, for example, which may be initiated via a mechanically and/or electromagnetically generated pulse that is emitted by corresponding automatic or manual triggering in the temperature conditioning device 80.

The handlebar grips 70 may advantageously be preconditioned by the particular temperature conditioning device 80 when for an electric bicycle 1 that is parked, i.e., not in use, a temperature of the handlebar grips 70 at relatively low outside temperatures perceived as uncomfortable is far below the rider's body temperature, or at relatively high outside temperatures or when solar radiation is acting directly on the handlebar grips 70 which is perceived as uncomfortable, is far above the rider's body temperature.

The sensor elements 78, vibration elements 79, and temperature conditioning devices 80 as well as the headlight 40, proximity sensor 43, and operating units 62 situated on the handlebar grips 70 are connected to the energy storage device 2 and/or to the control unit 60 of the electric bicycle 1 in an energy- and/or signal-transmitting manner, either directly via energy and/or signal transmission lines 84, or via the electronic component 29 accommodated in the cavity 26 of the stem 20. The energy and/or signal transmission lines 84 are led through line guides 27, 28 and in the stem 20 into the cavity 26, and may be guided in the clearance space 77 inside the handlebar 7 to the sensor elements 78, vibration elements 79, temperature conditioning device 80, headlight 40, and/or operating units 62, or outwardly led through at least one exit opening (not shown) formed in the stem 20 in the area of the handlebar connecting pieces 22, 23 and/or on an end-face side pointing in the travel direction V, from where they are alternatively or additionally connected to the sensor elements 78, vibration elements 79, temperature conditioning devices 80, and the headlight 40, proximity sensor 43, and/or operating units 62. The energy and/or signal transmission lines 84 may be sealingly enclosed by line sealing elements (not shown) in the at least one exit opening, which in turn are sealingly accommodated in the exit openings, at least on the outer circumference, in order to close them with a preferably hermetic seal.

From the cavity 26, the energy and/or signal transmission lines 84 are either led directly to the energy storage device 2 and/or to the control unit 60, or initially connected to the electronic component 29, which may contain at least one printed circuit board. The electronic component 29 is used to bundle, distribute, convert, and/or condition electrical or electronic signals. Thus, for example, the so-called "energy bus" or a similar standardized system for electrically connecting the components of the electric bicycle 1 may be used as a known standard system for energy and/or data transmission between the electronic component 29 and the control unit 60. From the electronic component 29, it is thus possible for the sensor elements 78, vibration elements 79, temperature conditioning devices 80, headlight 40, proximity sensor 43, and/or operating units 62 to be centrally electronically controlled, queried, and/or supplied with electrical energy or receive. electrical energy, which helps to minimize the number or the extent of energy and or data transmission lines 84 to be led from the stem 20 into the frame.

Further input and/or output elements, for example in the form of sensor elements 78, 79 (see FIG. 5), vibration elements 79, a temperature conditioning device 80, and/or operating units 62, and additionally at least one sound generation element 85 may be situated at or on the electronic component 29. Alternatively or additionally, the at least one sound generation element 85 may be mounted at any other location on and/or in the electric bicycle 1 and connected to the energy storage device 2 and/or the control unit 60, either directly via energy and/or signal transmission lines, or via the electronic component 29, for example. By use of the sound generation element 85, which may be designed as a speaker or a simple sound generator, for example, acoustic signals may be generated and thus provided to the rider. Alternatively or additionally, acoustic signals may be generated as warning and/or information signals, for example horn and/or bell signals, that may be triggered automatically with the aid of the electronic component 29 and/or the control unit 60, and/or manually by operation of the sensor elements 78 and/or operating units 62.

The energy and/or signal transmission lines 84 are led from the cavity 26 in the stem 20 to the control unit 60 and/or to the adapter 65. Since the adapter 65 is directly situated on the top side of the stem 20, the adapter 65 may be situated directly above the cavity 26, and thus easily connected to energy and/or signal transmission lines 84 that are led to it from the cavity 26. Energy and/or signal transmission lines 84 leading from the cavity 26 to the control unit 60 are guided into the frame 31 through the shaft receptacle 25 of the stem 20. The shaft receptacle 25 is used to accommodate a steerer tube (not shown) of the fork 9 that is to be nonrotatably connected to the stem 20.

In order to provide sufficient clearance space or leeway in the area of the shaft receptacle 25 for leading the energy and/or signal transmission lines 84 from the stem 20 into the frame 31, at least one of the line holders 15, 16 which extends along the shaft receptacle 25 is provided. The hollow cylindrical component 10 is accommodated in the area of the shaft receptacle 25 in the stem 20. The at least one line holder 15, 16 is formed on the hollow cylindrical component 10. The inner cavity 11, which is formed from the hollow cylindrical component 10, at least in sections, is designed to enclose the steerer tube at least in sections, which makes it possible for the at least one line holder 15, 16 that is open toward the cavity 11 to guide in each case at least one energy and/or signal transmission line 84 along the steerer tube, from the stem 20 into the frame 31.

At least one steering torque influencing element 86 is situated in the area of the shaft receptacle 25 or between the shaft receptacle 25 and the frame 31 and/or between the steerer tube and the frame 31, and is designed to influence a steering torque M that acts between the stem 20 and the frame 31 and is thus present at the handlebar 7 opposite from the frame 31, and that acts on the steerer tube about a longitudinal axis L of the shaft receptacle 25 or of the hollow cylindrical component 10. The steering torque influencing element 86 may be designed, for example, to counteract the steering torque M or increase a steering resistance, in that it contains means, for example friction, pressure, and/or fitting devices, for establishing a frictional, force-fit, and/or form-fit connection between the shaft receptacle 25 and the frame 31 and/or between the steerer tube and the frame 31. In the extreme case, the steering torque influencing element 86 may lock the shaft receptacle 25 and/or the steerer tube with respect to the frame 31 to form a type of handlebar lock for securing the electric bicycle 1. Alternatively or additionally, the steering torque influencing element 86 may increase the steering torque M or decrease a steering resistance, in that it includes a drive means, for example at least one servomotor, that is designed to apply a steering torque M, at least partially, or to counteract it.

Also apparent in FIG. 4 is a course of at least one brake line 87 that is led from the handlebar connecting pieces 22, 23 into the shaft receptacle 25. The at least one brake line 87, generally two brake lines 87, is/are connected in each case to a brake lever (not shown) that is associated with one of the handlebar grips 70 and is designed to cooperate with at least one braking device (not shown) of the electric bicycle 1 via the corresponding brake line 87 when actuated by at least one of the rider's fingers. For this purpose, the at least one brake line 87 may be configured as a cable pull or hydraulic line that is designed to transmit brake traction or brake pressure to the braking device.

In the present exemplary embodiment, the brake lines 87 together with the energy and/or supply lines 84 are led, at least in sections, inside the handlebar 7, and for connection to the particular brake lever may be guided outwardly through the above-mentioned exit openings, thus being sealingly enclosed by a corresponding power density element. A brake line 87 associated with the handlebar grip 70 pointing in the port direction B is guided through the line guide 27, extending from the handlebar connecting pieces 22, into the cavity 26, and from there into a first leadthrough 88 in the stem 20, via which it passes into the fork 9 and extends further toward a wheel brake that acts on the front wheel 6. The first leadthrough 88 extends centrally through the shaft receptacle 25 or a steerer tube accommodated therein, essentially along the longitudinal axis L, until reaching the fork 9. A brake line 87 associated with the handlebar grip 70 pointing in the starboard direction S is guided through the line guide 28, extending from the handlebar connecting pieces 23, into the cavity 26, and from there into a second leadthrough 89 in the stem 20, via which it passes into the frame 31 and extends further toward a wheel brake that acts on the rear wheel 5. The second leadthrough 89 is formed on the outside of the hollow cylindrical component 10, and extends there from the cavity 26 into the frame 31.

Figure 5:
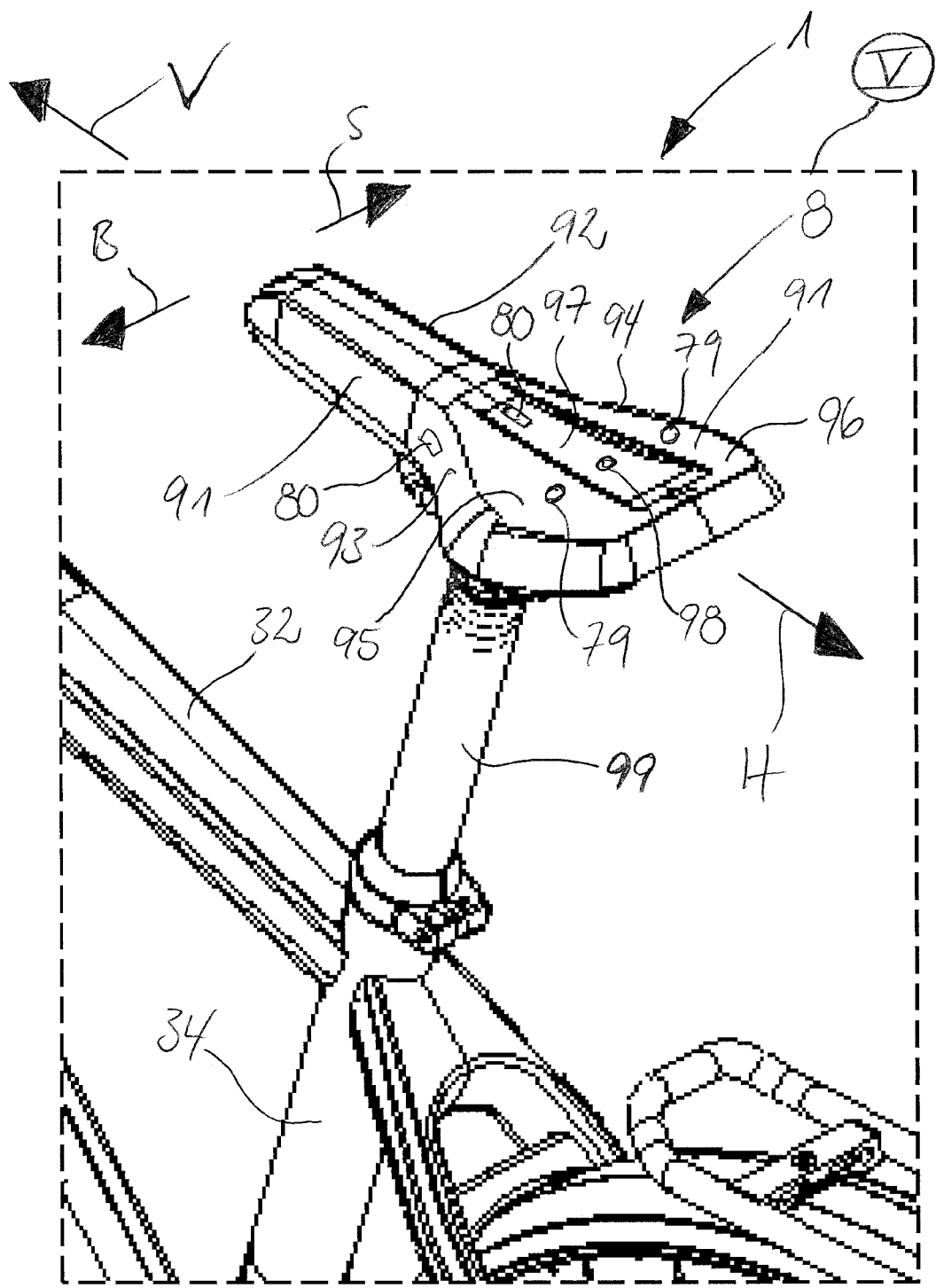

FIG. 5 shows a detail V from FIG. 2, in which in particular the saddle 8 of the electric bicycle 1 is illustrated. The saddle 8 has a seat surface 90, a port-side, i.e., left, first side surface 91, and a starboard-side, i.e., right, second side surface 92. A first lateral crest 93 and a second lateral crest 94 connect the first side surface 91 and the second side surface 92, respectively, to a port-side, i.e., left, first seat section 95 and a starboard-side, i.e., right, second seat section 96 of the seat surface 91. A seat pan 97 extends between the seat sections 95, 96, essentially in parallel to the travel direction V or rear direction H.

At least one vibration element 79 is provided in the area of the seat surface 91. For example, a vibration element 79 is situated in each of the seat sections 95, 96, below the seat surface 91. The vibration elements 79 situated in the seat surface 91 are advantageously arranged and oriented in such a way that vibrations which they generate act in the area of the respective ischia of the rider's pelvic bone, and may thus be transmitted very efficiently to, and clearly tactilely perceived by, the rider.

In addition, the electric bicycle 1 includes at least one thermal sensor element 98 for measuring the temperature. For this purpose, the at least one thermal sensor element 98 includes at least one electrical or electronic component whose electrical resistance changes as a function of temperature and/or which directly delivers a processable signal, for example an NTC thermistor, a PTC thermistor, a semiconductor temperature sensor, a thermocouple, a temperature switch, a ferromagnetic temperature sensor, and/or a fiber optic temperature sensor or the like. In the present exemplary embodiment, the at least one thermal sensor element 98 is situated on the saddle 8 of the electric bicycle 1. For example, the at least one thermal sensor element 98 is situated in the area of the seat surface 91 or in the seat pan 98. Alternatively or additionally, at least one further thermal sensor element 98 may be situated at a selected further location on the electric bicycle 1, depending on the particular requirements, for example in the area of the handlebar grips 70 and/or in the area of the energy storage device 2.

In addition, at least one temperature conditioning device 80 is situated in the area of the lateral crests 93, 94 and/or the seat pan 97 in order to control the temperature of the saddle 8. Thus, for example, at least one temperature conditioning device 80 is advantageously situated in the area of each of the lateral crests 93, 94 in such a way that it provides a temperature conditioning effect close to the main blood vessels in each thigh of the rider, for example the arteria *femoralis* and/or vena *femoralis*, in order to provide a preferably wide-ranging temperature conditioning function for the rider. At least one temperature conditioning device 80 situated in the area of the seat pan 80 is advantageously configured in such a way that it provides a temperature conditioning effect in the area of the pubic bone of the rider's pelvic bone. Alternatively or additionally, the at least one temperature conditioning device 80 in the saddle 9 may interact with a fluid, for example a gel, that is present in the saddle in order to circulate this fluid to be temperature-conditioned or temperature-controlled so that it regulates the temperature of the seat surface 90, the lateral crests 93, 94, and/or the seat pan 97, for example.

At relatively high outside temperatures, temperature conditioning devices 80 provided in this way may assist in creating cooling for the rider which is perceived as pleasant and refreshing. In contrast, at relatively low outside temperatures, the saddle 9 may be comfortably heated. In addition, the saddle 9 may also be preconditioned, in particular by a temperature conditioning device 80 situated in the area of the seat surface 91 or the seat pan 97, when for an electric bicycle 1 that is parked, i.e., not in use, a temperature of the saddle 9, in particular of the seat surface 91, at relatively low outside temperatures perceived as uncomfortable is far below the rider's body temperature, or at relatively high outside temperatures or when solar radiation is acting directly on the saddle 9 perceived as uncomfortable, is far above the rider's body temperature.

Vibration elements 79 and/or temperature conditioning devices 80 situated in or on the saddle 9 are connected to the energy storage device 2 and/or to the control unit 60 in an energy- and/or signal-transmitting manner via at least one energy and/or signal transmission line 84. The at least one energy and/or signal transmission line 84 is advantageously laid inside a seat post 99, which mechanically connects the saddle 9 to the frame 31 of the electric bicycle 1. The seat post 99 is accommodated in the seat tube 34 of the frame 31. The at least one energy and/or signal transmission line 84 extends from the saddle 8, through the seat post 99 and into the seat tube 34, and from there extends further to the energy storage device 2 and/or control unit 60.

Figure 6:
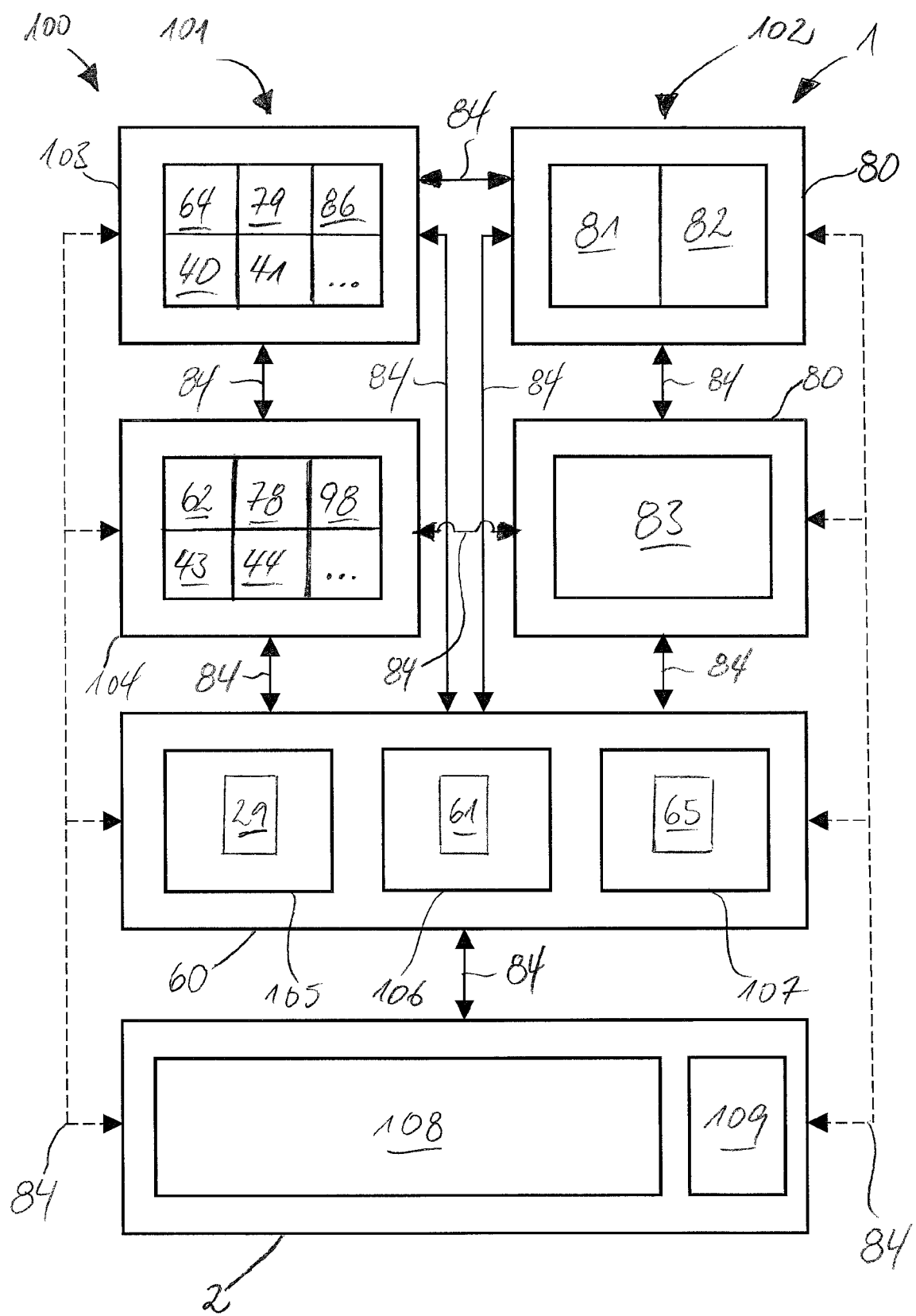

FIG. 6 shows a schematic diagram of a communication system 100 according to the invention of the electric bicycle 1. The communication system 100 includes the energy storage device 2, the control unit 60, and a communication device 101 and a temperature conditioning device 102, which are connected to one another in a parallel and/or serial connection via respective energy lines and/or signal lines 84 of the communication system 100.

The communication device 101 includes a signal device 103 and a sensor device 104. The signal device 103 includes at least one headlight 40, at least one tail light 41, at least one lighting element 64, at least one vibration element 79, and/or at least one steering torque influencing element 86. The sensor device 104 includes at least one front proximity sensor 43, at least one rear proximity sensor 44, at least one operating unit 62 having at least one control button 63, at least one tactile sensor element 78, and/or at least one thermal sensor element 98. The temperature conditioning device 102 includes at least one cooling element 81, at least one heating element 82, and/or at least one latent heat storage element 83, which together or in combination with one another or individually form at least one temperature conditioning device 80 of the electric bicycle 1.

The control unit 60 includes at least one processing module 105, at least one control module 106, and/or at least one communication module 107. The processing module 105 includes at least the at least one electronic component 29 or is connected to the at least one electronic component 29 at least in an energy- and/or signal-transmitting manner. The control module 106 includes at least the at least one display device 61 or is connected to the at least one display device 61 at least in an energy- and/or signal-transmitting manner. The communication module 107 includes the at least one adapter 65 or is connected to the at least one adapter 64 at least in an energy- and/or signal-transmitting manner, and is designed to communicate with a mobile device, a data memory, and/or a medical device via the adapter 64 or some other wired or wireless communication means (see FIG. 7).

The energy storage device 2 includes a drive energy store 108 and a backup energy store 109. The drive energy store 108 is designed, for example, as a drive battery in the form of a rechargeable battery. Drive energy, for example electrical power, for operating the electric drive 3 and/or the communication system 100 may be stored in the drive energy store 108. In a drive mode of the electric bicycle 1, the electric drive 3 is fed from the drive energy store 108. In a recuperation mode of the electric bicycle 1, the drive energy store 108 is fed with electrical energy that is recovered in the electric drive 3. The backup energy store 109, designed, for example, as a spare battery or buffer battery in the form of a rechargeable battery, is used to supply the communication system 100 with electrical power in the event of a critical state of discharge of the drive energy store 108 and/or when the drive energy store 108 is disconnected from the electric bicycle 1.

Figure 7:
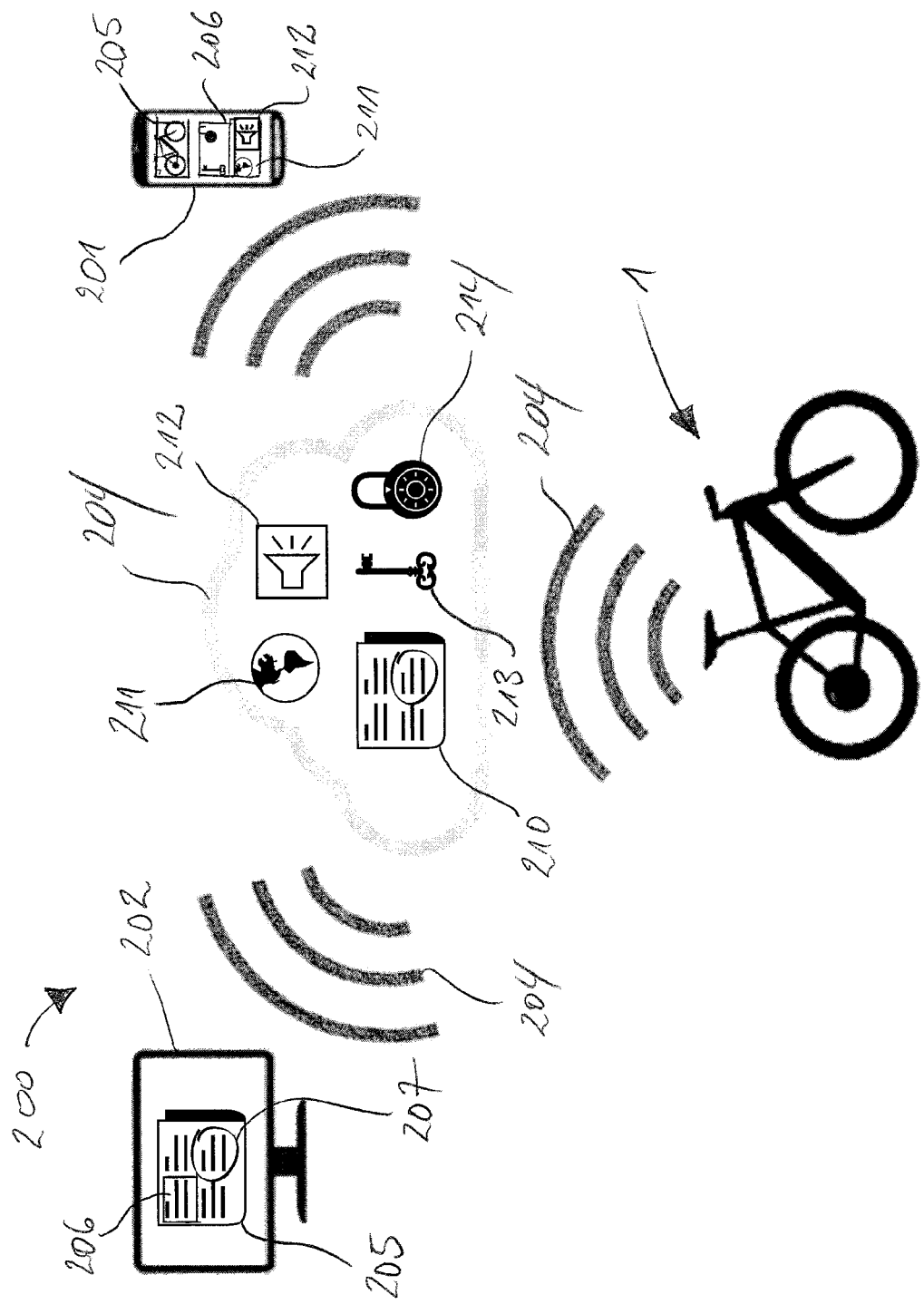

FIG. 7 shows a schematic diagram of a communication system 200 according to the invention together with an electric bicycle 1 according to the invention. The communication system 200 includes at least one device 201, for example a mobile device such as a mobile telephone or smart phone, a data memory, and/or a medical device, and a management device 202 that communicate with one another via communication links 204 that are established via a network 203. The device 201 and the management device 202 may be implemented as hardware and/or software on any desired electronic devices, such as computers, smart phones, handhelds, or tablets together with associated peripheral devices, etc., depending on the particular requirements, and each includes a control module 205 and corresponding devices for establishing the communication links 104 in order to be connected to the communication module 107 of the electric bicycle 1 via the network 103, and thus, to cooperate with the control unit 60 and/or the communication system 100 of the electric bicycle 1 with data exchange.

In particular, information and signals including the vehicle parameters 210, navigation parameters 211, operating, warning, information, and/or control signals 212, electronic security keys 213, and vehicle identifiers 214 may thus be exchanged between the electric bicycle 1 or its communication system 100, the device 201, and/or the management device 202 in order to be managed, processed, and/or stored in the control module 105, registration module 206, and/or alarm database module 207. The information and signals, in particular the vehicle parameters 210, navigation parameters 211, and/or operating, warning, information, and/or control signals 212, may be output or generated with the aid of the signal device 103 and/or the sensor device 104, and/or for controlling the communication device 101 and the temperature conditioning device 102 on the one hand and for controlling the device 201 and/or the management device 202 on the other hand.

For this purpose, the control unit 60, device 201, and/or management device 202, depending on the particular requirements, include(s) at least one microprocessor or some other type of processor, and at least one computer-readable medium containing computer-readable program code (software and/or firmware, for example) that is executable by at least one (micro)processor, as well as logic gates, switches, application-specific integrated circuits (ASICs), and/or programmable logic controllers. The energy and/or signal transmission lines 84 and communication links may be designed, depending on the particular requirements, to establish wireless and/or wired connections for energy and/or signal or information transmission between corresponding elements and components of the electric bicycle 1, the communication system 100, and/or the communication system 200, for example with the aid of electrically conductive connections, optical connections, wireless connections, and the like, which depending on the particular requirements may use digital and/or analog signals to collectively and individually carry out particular functions.

| List of reference symbols | |
| --- | --- |
| 1 | electric bicycle/vehicle |
| 2 | energy storage device |
| 3 | electric drive |
| 4 | pedal drive |
| 5 | rear wheel |
| 6 | front wheel |
| 7 | handlebar |
| 8 | saddle |
| 9 | fork |
| 10 | hollow cylindrical component |
| 11 | inner cavity |
| 15, 16 | line holder |
| 20 | stem |
| 22, 23 | handlebar connecting piece |
| 25 | shaft receptacle |
| 26 | cavity |
| 27, 28 | line guide |
| 29 | electronic component |
| 31 | frame/bicycle frame |
| 32 | top tube |
| 33 | down tube |
| 34 | seat tube |
| 35 | upper tube |
| 36 | rear assembly |
| 37 | lower tube |
| 40 | headlight |
| 41 | tail light |
| 42 | fender |
| 43 | front proximity sensor |
| 44 | rear proximity sensor |
| 50 | crank arm |
| 51 | pedal |
| 60 | control unit |
| 61 | display device |
| 62 | operating unit |
| 63 | control button |
| 64 | lighting element |
| 65 | adapter |
| 70 | handlebar grip |
| 71 | handlebar tube |
| 72 | support area |
| 73 | grip end area |
| 74 | inner finger area |
| 75 | middle finger area |
| 76 | outer finger area |
| 77 | clearance space |
| 78 | tactile sensor element |
| 79 | vibration element |
| 80 | temperature conditioning device |
| 81 | cooling element |
| 82 | heating element |
| 83 | latent heat storage element |
| 84 | energy and/or signal transmission line |
| 85 | sound generation element |
| 86 | steering torque influencing element |
| 87 | brake line 40 |
| 88 | first leadthrough |
| 89 | second leadthrough |
| 90 | seat surface |
| 91 | first side surface |
| 92 | second side surface |
| 93 | first lateral crest |
| 94 | second lateral crest |
| 95 | first seat section |
| 96 | second seat section |
| 97 | seat pan |
| 98 | thermal sensor element |
| 99 | seat post |
| 100 | communication system |
| 101 | communication device |
| 102 | temperature conditioning device |
| 103 | signal device |
| 104 | sensor device |
| 105 | processing module |
| 106 | control module |
| 107 | communication module |
| 108 | drive energy store |
| 109 | backup energy store |
| 200 | communication system |
| 201 | device |
| 202 | management device |
| 203 | network |
| 204 | communication link |
| 205 | control module |
| 206 | registration module |
| 207 | alarm database module |
| 210 | vehicle parameter |
| 211 | navigation parameter |
| 212 | warning, information, and/or control signal |
| 213 | security key |
| 214 | vehicle identifier |
| B | port direction/left |
| H | rear direction/rear |
| L | longitudinal axis |
| M | steering torque |
| S | starboard direction/right |
| V | travel direction/front |

The invention claimed is:

1. An electric bicycle having a communication system, comprising at least one electronic processing module for processing information for the rider of the electric bicycle, and at least one signal device for providing the processed information to the rider,
    wherein the at least one signal device is designed to output the information as a tactile, optical, and/or acoustic signal emitted by the electric bicycle in order to spontaneously influence the rider, and
    wherein the communication system is connected to at least one tactile sensor element arranged on at least one of the handlebar grips of the electric bicycle as an input and output element for controlling the communication system through inputs by the rider and through recognizing whether a part of the electric bicycle is in contact with another object.

2. The electric bicycle according to claim 1, wherein the processing module is part of a central electronic control unit of the electric bicycle and/or is connected in an information-transmitting manner with the control unit.

3. The electric bicycle according to claim 1, wherein the electric bicycle is equippable with an energy storage device that provides drive energy, wherein the communication system is connected to the energy storage device to receive operating power.

4. The electric bicycle according to claim 1, wherein the communication system is at least partially integrated into the handlebar and/or the stem of the electric bicycle.

5. The electric bicycle according to claim 1, wherein the communication system is at least partially integrated into a frame of the electric bicycle.

6. The electric bicycle according to claim 1, wherein the at least one signal device is designed output a signal when the information represents a hazardous situation.

7. The electric bicycle according to claim 1, wherein the communication system has at least one proximity sensor for detecting an approaching object, the proximity sensor being in signal-transmitting connection with the processing module.

8. The electric bicycle according to claim 1, wherein the processing module is designed for processing direction information and/or distance information.

9. The electric bicycle according to claim 1, wherein the processing module is designed for processing navigation information.

10. The electric bicycle according to claim 1, wherein the signal comprises a light signal, a vibration signal, a change in steering resistance, and/or a change in temperature.

11. The electric bicycle according to claim 1, wherein the signal device is designed to cooperate with vibration elements in the handlebar, in the pedals, and/or in the saddle of the electric bicycle.

12. The electric bicycle according to claim 11, wherein the signal device is designed to cooperate with at least two vibration elements that are associated with the handlebar grips of the electric bicycle.

13. The electric bicycle according to claim 1, wherein the signal device is designed to influence the steering resistance by means of a steering torque influencing element.

14. The electric bicycle according to claim 1, comprising a communication module for emitting and/or for receiving information to/from mobile devices, data memories, and/or medical devices.

15. The electric bicycle according to claim 1, wherein the at least one tactile sensor element is designed to detect whether the rider grasps the handlebar grip in order to record operating signals.

16. The electric bicycle according to claim 1, wherein the part of the electric bicycle is a grip end area.

* * * * *